US011343587B2

(12) United States Patent
Denslow et al.

(10) Patent No.: US 11,343,587 B2
(45) Date of Patent: May 24, 2022

(54) TECHNIQUES FOR ESTIMATING PERSON-LEVEL VIEWING BEHAVIOR

(71) Applicant: Disney Enterprises, Inc., Burbank, CA (US)

(72) Inventors: Thomas Denslow, Winter Garden, FL (US); Haining Yu, Windermere, FL (US); David T. Parker, Orlando, FL (US); Jingyang Xu, Orlando, FL (US); Ludwig Kuznia, Lakeland, FL (US)

(73) Assignee: Disney Enterprises, Inc., Burbank, CA (US)

( * ) Notice: Subject to any disclaimer, the term of this patent is extended or adjusted under 35 U.S.C. 154(b) by 369 days.

(21) Appl. No.: 15/441,180

(22) Filed: Feb. 23, 2017

(65) Prior Publication Data

US 2018/0242050 A1    Aug. 23, 2018

(51) Int. Cl.
*G06F 30/00* (2020.01)
*H04N 21/658* (2011.01)
(Continued)

(52) U.S. Cl.
CPC ... *H04N 21/6582* (2013.01); *H04N 21/44222* (2013.01); *H04N 21/4532* (2013.01)

(58) Field of Classification Search
None
See application file for complete search history.

(56) References Cited

U.S. PATENT DOCUMENTS

| | | | | |
|---|---|---|---|---|
| 8,185,448 | B1* | 5/2012 | Myslinski | H04L 51/063 705/26.1 |
| 8,527,640 | B2* | 9/2013 | Reisman | H04N 21/4312 709/228 |

(Continued)

FOREIGN PATENT DOCUMENTS

| | | | | |
|---|---|---|---|---|
| JP | 07073243 | A * | 3/1995 | ........... H04N 7/0887 |
| JP | 2003018584 | A * | 1/2003 | ......... G06Q 30/0254 |

(Continued)

OTHER PUBLICATIONS

The Nielsen Company. National TV Toolbox Online Help Release 7.1.3. (Nov. 4, 2014). Retrieved online Dec. 29, 2020. http://en-us.nielsen.com/sitelets/cls/documents/ntt/NTT-User-Guide.pdf (Year: 2014).*

Janice Hui. Profiling Your Target Market. (Apr. 19, 2007). Retrieved online Dec. 21, 2021. https://www.cbsnews.com/news/profiling-your-target-market/ (Year: 2007).*

(Continued)

*Primary Examiner* — James A Reagan
(74) *Attorney, Agent, or Firm* — Artegis Law Group, LLP

(57) ABSTRACT

In one embodiment, a viewing behavior subsystem computes estimated viewership among target audiences at a person-level based on a household viewing logs and person-level data. A viewing behavior subsystem distributes the household viewing logs across buckets based on the sizes of the households and sets of person-level characteristics that are associated with the persons within the households. The viewing behavior subsystem generates a model for viewing behaviors associated with different sets of person-level characteristics based on the buckets. Subsequently, the viewing behavior subsystem estimates viewership among a target audience that is associated with one or more of the sets of person-level characteristics based on the model and census data. Advantageously, by combining household viewing logs for a relatively large number of households with person-level data, the viewing behavior subsystem enables accurate estimations of viewership among target audiences that are distinguished by person-level characteristics.

20 Claims, 4 Drawing Sheets

(51) Int. Cl.
  *H04N 21/45*    (2011.01)
  *H04N 21/442*   (2011.01)

(56) References Cited

U.S. PATENT DOCUMENTS

| | | | | |
|---|---|---|---|---|
| 9,071,370 | B2* | 6/2015 | Toner | H04N 21/44204 |
| 9,800,913 | B2* | 10/2017 | Levande | H04N 21/4661 |
| 2003/0067554 | A1* | 4/2003 | Klarfeld | G11B 27/105 |
| | | | | 348/461 |
| 2003/0172374 | A1* | 9/2003 | Vinson | G06Q 30/02 |
| | | | | 725/9 |
| 2006/0282328 | A1* | 12/2006 | Gerace | G06F 16/9535 |
| | | | | 705/14.66 |
| 2007/0136782 | A1* | 6/2007 | Ramaswamy | H04N 21/8358 |
| | | | | 725/138 |
| 2007/0288978 | A1* | 12/2007 | Pizzurro | H04N 21/2743 |
| | | | | 725/112 |
| 2012/0260278 | A1* | 10/2012 | Lambert | H04N 21/25883 |
| | | | | 725/14 |
| 2012/0272259 | A1* | 10/2012 | Cortes | H04N 21/4668 |
| | | | | 725/14 |
| 2013/0318546 | A1* | 11/2013 | Kothuri | H04H 60/33 |
| | | | | 725/12 |
| 2014/0006951 | A1* | 1/2014 | Hunter | H04N 21/431 |
| | | | | 715/719 |
| 2014/0289017 | A1* | 9/2014 | Trenkle | G06Q 10/06375 |
| | | | | 705/7.33 |
| 2015/0189351 | A1* | 7/2015 | Kitts | H04N 21/25891 |
| | | | | 725/19 |
| 2016/0105699 | A1* | 4/2016 | Luzzi | H04N 21/252 |
| | | | | 725/14 |
| 2016/0249098 | A1* | 8/2016 | Pecjak | H04N 21/44218 |
| 2016/0269766 | A1* | 9/2016 | Levande | H04N 21/25883 |
| 2017/0006342 | A1* | 1/2017 | Nagaraja Rao | H04N 21/4663 |
| 2017/0353766 | A1* | 12/2017 | Kurzynski | H04N 21/4667 |
| 2021/0133790 | A1* | 5/2021 | Manning | G06Q 30/0208 |

FOREIGN PATENT DOCUMENTS

| | | | | |
|---|---|---|---|---|
| JP | 2010130585 A | * | 6/2010 | H04N 7/173 |
| JP | 2014140222 A | * | 7/2014 | H04N 21/6181 |

OTHER PUBLICATIONS

Scott Sereday et al. Using Machine Learning To Predict Future TV Ratings. (Feb. 2017). Retrieved online Dec. 21, 2021. https://www.nielsen.com/wp-content/uploads/sites/3/2019/04/using-machine-learning-to-predict-future-tv-ratings.pdf (Year: 2017).*

* cited by examiner

TECHNIQUES FOR ESTIMATING PERSON-LEVEL VIEWING BEHAVIOR

BACKGROUND OF THE INVENTION

Field of the Invention

Embodiments of the present invention relate generally to computer processing and, more specifically, to techniques for estimating person-level viewing behavior.

Description of the Related Art

Estimating linear programming viewing behavior is an integral part of negotiating advertising contracts. "Linear programming viewing" refers to viewing programs as scheduled and aired by a broadcaster. As a general matter, as the number of persons included in a target audience for a particular product that likely will view a program increases, the more an advertiser of that product will pay to advertise during the program. Accordingly, to maximize advertising rates, broadcasters oftentimes provide "guarantees" with respect to the level of viewership among target audiences. For example, to maximize the amount an advertiser will pay for an advertisement for full-size trucks during a football game, a broadcaster could provide a guarantee of a minimum viewership of the game among males aged 18-49. To provide reliable guarantees to a wide assortment of advertisers, broadcasters need accurate estimates of historical viewership among a variety of target audiences.

In that regard, many broadcasters rely on active viewing logs to estimate viewership, where the active viewing logs are typically gathered from a viewing panel of participating households. For example, within each participating household, a specialized meter can track which of the persons within the household are watching each program based on input entered into the specialized meter by those persons. One limitation of active viewing logs is that the number of households participating in the viewing panels is usually quite small relative to the number of television-equipped homes within the broadcast area. For example, a typical viewing panel may include only about 25,000 households. By contrast, there are approximately 115 million television-equipped homes throughout the United States, which is a typically broadcast area. Because of the small sample sizes, broadcasters are oftentimes unable to generate reliable estimates of viewership across large viewing audiences spanning large broadcast areas using active viewing logs.

Other broadcasters rely on household viewing logs to estimate viewership among target audiences, where the household viewing logs are gathered automatically via set-top boxes (STBs) and over-the-top (OTT) devices. STBs convert broadcast video content to analog or digital television signals, and are typically included in cable television systems, satellite systems, and the like. By contrast, OTT devices deliver film and television content via the Internet. In general, about 50 million of the television-equipped homes in the United States provide household viewing logs via STBs and OTT devices. Accordingly, the sample sizes associated with household viewings logs are much larger than the sample sizes associated with active viewing logs. Consequently, broadcasters can more accurately estimate viewership among target audiences by using household viewing logs instead of active viewing logs.

However, one limitation of household viewing logs is that, in contrast to active viewing logs, household viewing logs do not identify the person or people in each household that are viewing each program. For example, suppose a household includes a forty year old male and a three year old female. If a television in the household were tuned to a particular program, then the associated household viewing log would indicate that both the forty year old male and the three year old female had viewed the program. The household viewing log would likely be inaccurate, for example, if the program viewed were a late-night action movie with a lot of violence. As this example illustrates, household viewing logs do not allow broadcasters to provide viewership guarantees for target audiences that are distinguished by person-level characteristics. For example, household viewing logs would not allow a broadcaster to provide a reliable guarantee for program viewership among males aged 18-49.

As the foregoing illustrates, what is needed in the art are more effective techniques for estimating viewership among target audiences.

SUMMARY OF THE INVENTION

One embodiment of the present invention sets forth a computer-implemented method for estimating viewership among target audiences. The method includes assigning a first household viewing log to a first bucket of one or more household viewing logs based on person-level data, where the first bucket is associated with a single-person household and a first set of one or more person-level characteristics; assigning a second household viewing log to a second bucket of one or more household viewing logs based on the person-level data, where the second bucket is associated with a multi-person household and the first set of one or more person-level characteristics; generating a model of viewing behaviors based on at least the first bucket and the second bucket via one or more processors; and computing a first viewership among a first target audience that is associated with the first set of one or more person-level characteristics based on the model and census data.

One advantage of the disclosed techniques is that the techniques allow broadcasters to provide viewership guarantees across a wide range of target audiences. In particular, because the household viewing logs represent a relative large percentage of television-enabled households, the computed viewership among a target audience is reliable irrespective of the size of the target audience. Further, because viewing behavior is estimated at the person-level, the computed viewership among a target audience that is distinguished by person-level characteristics, such as age and gender, is accurate.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
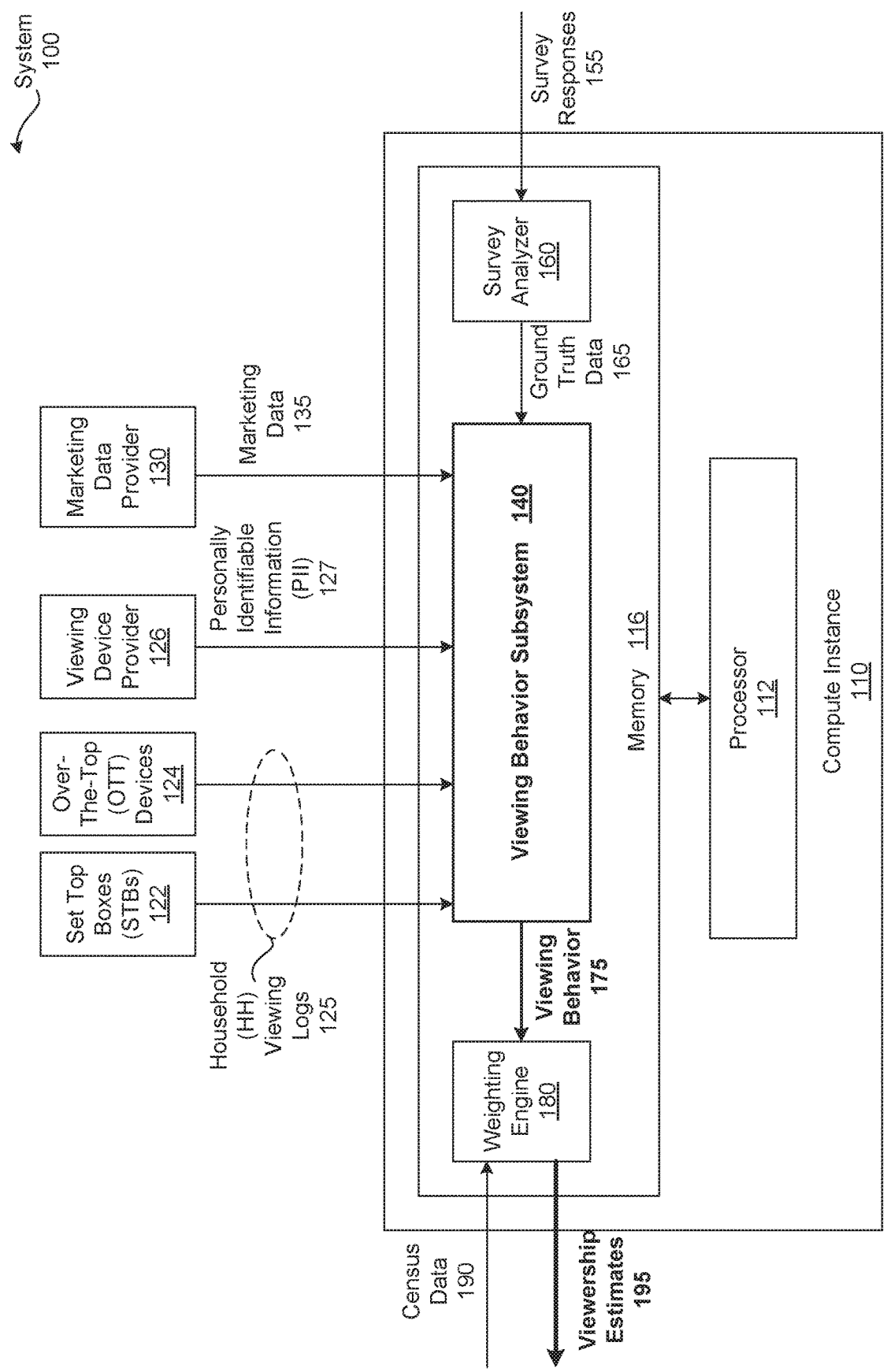
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a compute instance 110. The compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, cloud storage, or any suitable combination of the foregoing.

It will be appreciated that the system 100 shown herein is illustrative and that variations and modifications are possible. The number of compute instances 110, the number and type of processors 112, the number and type of memories 116, and the number of applications included in the memory 116 may be modified as desired. Further, the connection topology between the various units in FIG. 1 may be modified as desired. In some embodiments, any combination of the compute instance 110, the processor 112, and the memory 116 may be replaced with any type of distributed computer system or cloud computing environment, such as a public or a hybrid cloud.

In general, the system 100 is configured to estimate linear programming viewing behavior. Estimating linear programming viewing behavior is an integral part of negotiating advertising contracts. "Linear programming viewing" refers to viewing programs as scheduled and aired by a broadcaster. As a general matter, as the number of persons included in a target audience for a particular product that likely will view a program increases, the more an advertiser of that product will pay to advertise during the program. Accordingly, to maximize advertising rates, broadcasters oftentimes provide "guarantees" with respect to the level of viewership among target audiences. To provide reliable guarantees to a wide assortment of advertisers, broadcasters need accurate estimates of historical viewership among a variety of target audiences.

In that regard, many broadcasters rely on active viewing logs to estimate viewership, where the active viewing logs are typically gathered from a viewing panel of participating households. For example, within each participating household, a specialized meter can track which of the persons within the household are watching each program based on input entered into the specialized meter by those persons. One limitation of active viewing logs is that the number of households participating in the viewing panels is usually quite small relative to the number of television-equipped homes within the broadcast area.

Other broadcasters rely on household (HH) viewing logs 125 to estimate viewership among target audiences, where the household viewing logs 125 are gathered automatically via set-top boxes (STBs) 122 and over-the-top (OTT) devices 124. The STBs 122 convert broadcast video content to analog or digital television signals, and are typically included in cable television systems, satellite systems, and the like. By contrast, the OTT 124 devices deliver film and television content via the Internet. The household viewing logs 125 may include any amount and type of viewing data in any format and in any technically feasible fashion. For example, the household viewing logs 125 could include per-minute viewing data or start and end times whenever the associated television is turned on, tuned to a new station, etc.

Notably, the sample sizes associated with the household viewings logs 125 are much larger than the sample sizes associated with active viewing logs. Consequently, broadcasters can more accurately estimate viewership among target audiences by using the household viewing logs 125 instead of active view logs. However, one limitation of the household viewing logs 125 is that, in contrast to active viewing logs, the household viewing logs 125 do not identify the person or people in each household that are viewing each program. As a result, the household viewing logs 125 do not allow broadcasters to provide viewership guarantees for target audiences that are distinguished by person-level characteristics, such as gender and age.

Reliably Estimating Viewership Based on Person-Level Characteristics

To allow broadcasters to provide viewership guarantees for target audiences that are distinguished by person-level characteristics, the memory 116 includes, without limitation, the viewing behavior subsystem 140, the weighting engine 180, and the survey analyzer 160. The viewing behavior subsystem 140, the weighting engine 180, and the survey analyzer 160 execute on the processor 112. In alternate embodiments, the memory 116 may not include the viewing behavior subsystem 140, the weighting engine 180, and/or the survey analyzer 160. Instead, the viewing behavior subsystem 140, the weighting engine 180, and/or the survey analyzer 160 may be provided as an application program (or programs) stored on computer readable media such as a CD-ROM, DVD-ROM, flash memory module, or other tangible storage media.

In various embodiments, the functionality of the viewing behavior subsystem 140, the weighting engine 180, and the survey analyzer 160 may be integrated into or distributed across any number (including one) of software applications. Further any number of the viewing behavior subsystem 140, the weighting engine 180, and the survey analyzer 160 may execute on any number of instruction execution systems or in any type of computing environment in any combination. For instance, in some embodiments, the viewing behavior subsystem 140 may execute on a distributed computer system or cloud computing environment instead of the processor 112.

As shown, the viewing behavior subsystem 140 receives without limitation, any amount and type of the household viewing logs 125, personally identifiable information (PII) 127, and marketing data 135. For explanatory purposes, as referred to herein, each household is associated with a separate household viewing log 125 that is included in the household viewing logs 125. Further, each of the household viewing logs 125 may include any type of viewing information in any format and in any technically feasible fashion. For instance, in some embodiments, each of the household viewing logs 125 may comprise any number of files that include any number of per-minute viewing data. In other embodiments, each of the household viewing logs 125 may comprise any number of files that include viewing start and end times.

Each of the household viewing logs 125 includes viewing data at the granularity of the household, but not at the granularity of each person within the household. However, for each person within each household, the viewing behavior subsystem 140 also receives the personally identifiable information (PII) 127 from the associated viewing device provider 126. The PII 127 may be any type of information that may be used alone or in conjunction with other data to distinguish a particular person. Examples of the PII 127 for a particular person are a passport number, a driver's licenses number, and a login name, to name a few. Consequently, for each of the household viewing logs 125, the PII 127 enables the viewing behavior subsystem 140 to identify the person(s) within the associated household.

In a complementary manner, the viewing behavior subsystem 140 receives the marketing data 135 from any number of marketing data providers 130. The marketing data 135 includes per-person marketing data that is distinguishable based on the PII 127 as well as household-level marketing data. In general, the marketing data 135 may include any amount and type of demographic data, psychographic data, and the like, at any level of granularity. For example, for each household, the marketing data 135 could include the household income. Further, for each person within each household, the marketing data 125 could include a gender, an age range, and an indication of whether the spending patterns, interests, and/or activities of the person are characteristic of a technophile.

Because the marketing data 135 typically includes a relatively large amount of information for each individual and for each household, the viewing behavior subsystem 140 buckets the marketing data 135 into broadly-defined groups of person-level characteristics. Each broadly-defined group of person-level characteristics is referred to herein as a "person bucket." The viewing behavior subsystem 140 may partition the marketing data 135 based on any number and type of person buckets in any technically feasible fashion. Further, the bucketing subsystem 150 may define the number and type of person buckets based on any number of characteristics.

In operation, the viewing behavior subsystem 140 combines the household viewing logs 125 with the person buckets based on the PII 127 to generate household buckets (not shown in FIG. 1). Each household bucket includes the household viewing logs 125 that represent a particular type of household. In particular, each household bucket is associated with a household size and, for each person within the household, a person bucket. For instance, in some embodiments, the viewing behavior subsystem 140 generates a household bucket that includes the household viewing logs 125 that represent two-person households that include two males aged 18-25. In alternate embodiments, the viewing behavior subsystem 140 may define the household buckets and assign the household viewing logs 125 to the household buckets based on any combination of per-household and/or per-person data in any technically feasible fashion.

Subsequently, the viewing behavior subsystem 140 implements machine learning operations to generate a viewing behavior model (not shown in FIG. 1) based on the household buckets and the person buckets. More precisely, the viewing behavior subsystem 140 analyzes each of the household buckets in an order of increasing household size. For each household bucket, the viewing behavior subsystem 140 estimates which person(s) within the household viewed each program based on the household viewing logs 125 and the person-level viewing estimates for household buckets associated with smaller household sizes. Finally, the viewing behavior subsystem 140 generates a viewing behavior model that estimates the viewing behavior at the granularity of the person buckets based on the person-level viewing estimates for all the household buckets.

The viewing behavior subsystem 140 then computes viewing behavior 175 based on the viewing behavior model. More precisely, for each person bucket, the viewing behavior subsystem 140 estimates the number or percentage of persons within the households represented by the household viewing logs 125 that viewed each program. Because the viewing behavior model combines the relatively large number of the household viewing logs 125 with the person-level marketing data 135, the viewing behavior model accurately models the viewing behavior 175 for each person bucket.

The weighting engine 180 generates viewership estimates 195 for any number of target audiences based on the viewing behavior 175 and census data 190. The weighting engine 180 may receive any amount and type of the census data 190 in any technically feasible fashion. In operation, the weighting engine weights the viewing behavior 175 based on the censuses data 190 to generate the viewership estimates 195 among the target audiences for the target programs. Weighting the viewing behavior 175 ensures that the viewership estimates 195 properly reflects the composition of the target audiences at the desired level (e.g., nationwide). Advantageously, unlike conventional approaches to estimating viewing behavior, the viewing behavior subsystem 140 and the weighting engine 180 may be configured to generate accurate viewership estimates 195 for relatively small target audiences that are distinguished by person-level characteristics.

To continually increase the accuracy of the viewership estimates 195, the survey analyzer 160 receives survey responses 155 and generates ground truth data 165. In general, the survey analyzer 160 receives the survey responses 155 in response to a survey that targets a sample of multi-person homes and includes questions to determine precisely which person(s) within each of the homes viewed each program. The sample of multi-person homes includes households that are distributed across a variety of the household buckets 215 or would be associated distributed across a variety of the household buckets 215 were they to be represented in the household viewing logs 125. The survey analyzer 160 processes the survey responses 155 and generates the ground truth data 165 that specifies the self-reported viewing behavior for each person. Periodically, the survey analyzer 160 may receive new survey responses 155 and generate new ground truth data 165.

The viewing behavior subsystem 140 computes errors between the ground truth data 165 and the person level viewing behavior 175. Subsequently, the viewing behavior subsystem 140 performs one or more optimization operations on the viewing behavior model to generate an updated viewing behavior model that is configured to reduce the errors. As the survey analyzer 160 generates new ground truth data 165, the viewing behavior subsystem recomputes the errors and updates the viewing behavior model. In this fashion, the survey analyzer 160 and the viewing behavior subsystem 140 work together to continually improve the accuracy of the viewing behavior model and the viewership estimates 195.

In some embodiments, as part of generating the ground truth data 165 and/or as part of optimizing additional analysis algorithms (not shown), the survey analyzer 160 may perform any number of data processing operations including outlier analysis operations. In general, the survey analyzer 160 may process the survey responses 155 received in response to any number of surveys that are targeted to any number and type of users as part of validating the measurements of any number of analysis algorithms. In particular, the survey analyzer 160 may attempt to identify and/or mitigate potential inaccuracies associated with out-of-home viewership algorithms and viewership overstatement algorithms. Further, in various embodiments, the survey analyzer 160 may adjust the ground truth data 165 to compensate for out-of-home viewership and/or viewership overstatements.

"Out-of-home viewership" refers to viewership that occurs in a household that a person does not belong to. In operation, if an out-of-home viewership algorithm determines that an abnormally large ratio of the households using televisions are tuned to a particular program, then the out-of-home viewership algorithm assigns a portion of the households that are not using televisions to out-of-home viewing. For example, suppose that the percentage of households using televisions is typically 20%, but during Super Bowl 50, the percentage of households using televisions was 5% and 100% of the households using televisions were watching the Super Bowl. The viewership algorithm would assign a portion of the households not using televisions to out-of-home viewership.

Viewership overstatement is experienced when the STBs 122 and OTT 124 devices report viewing, but the viewing is not likely to have actually occurred. In operation, a viewership overstatement algorithm merges household-specific behavior with population viewing behavior. If the viewership overstatement algorithm identifies that a person is assigned an abnormally long duration of viewing time compared to historical behavior, then the viewership overstatement algorithm may reduce the likelihood that the person viewed programs during the viewing time. For example, if a particular person is the only person tuned-in to a particular broadcaster from 11 PM to 4 AM and no other household demonstrates similar viewing behavior, then the viewing overstatement algorithm reduces the likelihood that the person viewed programs from 11 PM to 4 AM.

Note that the techniques described herein are illustrative rather than restrictive, and may be altered without departing from the broader spirit and scope of the invention. Many modifications and variations on the functionality provided by the viewing behavior subsystem 140 will be apparent to those of ordinary skill in the art without departing from the scope and spirit of the described embodiments. For instance, in various embodiments, any number of the techniques may be implemented while other techniques may be omitted in any technically feasible fashion that generates a viewing model based on viewing data at the household-level and marketing data at the person-level.

In alternate embodiments, the viewing behavior subsystem 140 may receive the household viewing logs 125, the PII 127, the marketing data 135, and any additional relevant information from any number of sources and in any combination. For instance, in some embodiments, the viewing behavior subsystem 140 receives the household viewing logs 125, the PII 127, and geographical locations of the set-top boxes 122 and the OTT devices 124 from any number of viewing device providers 126. Further, the viewing behavior subsystem 140 may generate the buckets in any technically feasible fashion based on the household viewing logs 125, the PII 127, the marketing data 135, and any additional relevant information.

In some alternate embodiments, for privacy purposes, the viewing behavior subsystem 140 may receive consolidated data that represents similar households or persons. For instance, the household viewing logs 125, the PII 127, and/or the marketing data 135 may be provided at the granularity of multiple households that share one or more characteristics. In such embodiments, the functionality of the viewing behavior subsystem 140 is modified accordingly. In other alternate embodiments, the viewing behavior subsystem 140 provides bucketing characteristics to the viewing device providers 126 and/or the marketing data providers 130. In such embodiments, the viewing device providers 126 and/or the marketing data providers 130 may perform bucketing operations instead of or in addition to any bucketing operations performed by the viewing behavior subsystem 140.

Modeling Person-Level Viewing Behavior

Figure 2:
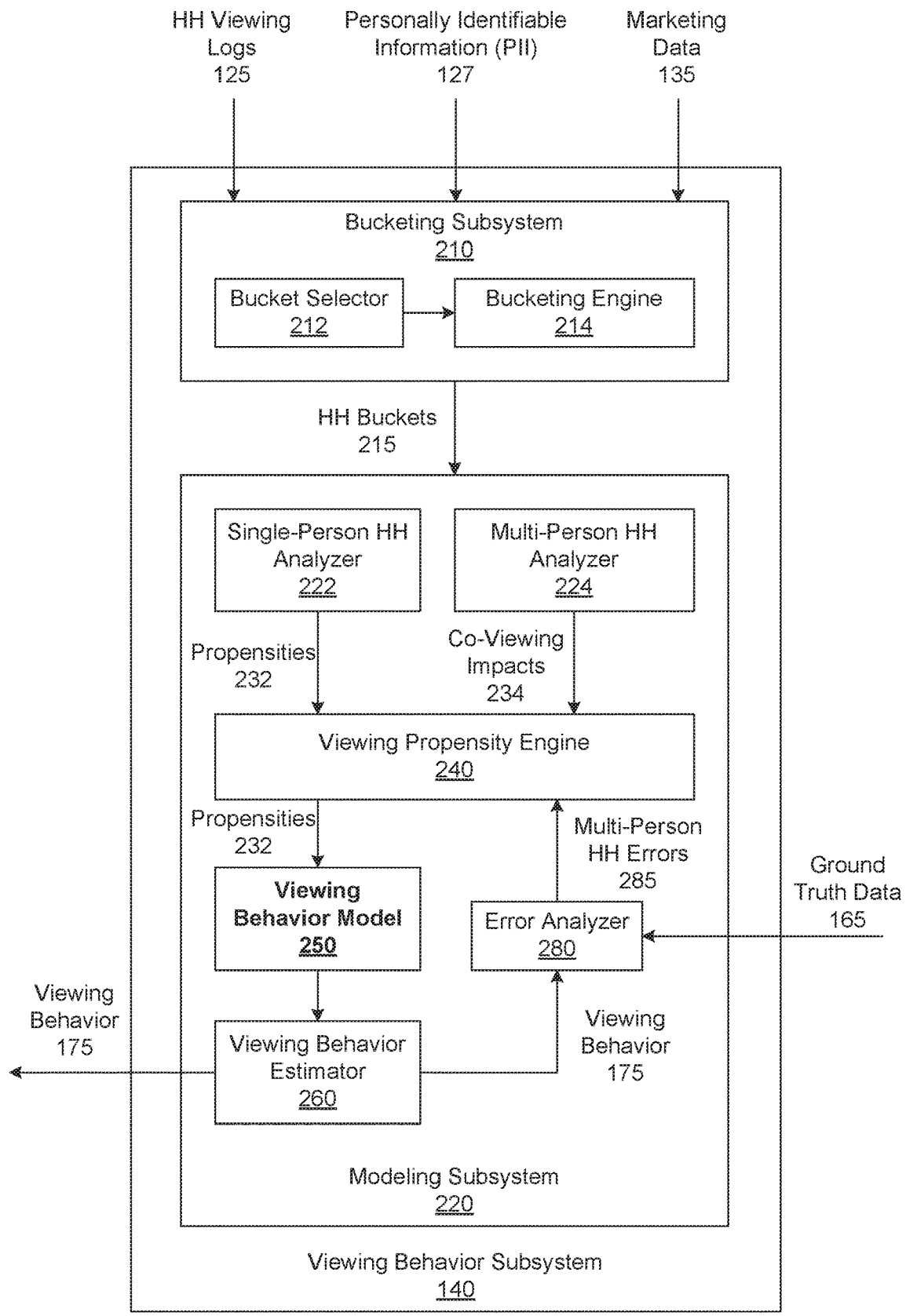
FIG. 2 is a more detailed illustration of the viewing behavior subsystem of FIG. 1, according to various embodiments of the present invention.

FIG. 2 is a more detailed illustration of the person-level viewing subsystem 140 of FIG. 1, according to various embodiments of the present invention. As shown, the person-level viewing subsystem 140 includes, without limitation, a bucketing subsystem 210 and a modeling subsystem 220. For explanatory purposes, multiple instances of like objects are denoted with reference numbers identifying the object and parenthetical numbers identifying the instance where needed.

The bucketing subsystem 210 includes, without limitation, a bucket selector 212 and a bucketing engine 214. The bucketing subsystem 210 receives the household viewing logs 125, the personally identifiable information (PII) 127, and the marketing data 135, and generates household (HH) buckets 215. First, the bucket selector 212 implements a bucketing strategy to define the number and characteristics of person buckets (not shown) and the household buckets 215. The bucket selector 212 may execute any number of data modeling, data science, and/or analytical techniques to analyze the household viewing logs 125 and/or the marketing data 135 to optimize the bucketing strategy.

For example, the bucket selector 212 may optimize the size of various age ranges for the person buckets based on the composition of the persons within the households represented by the household viewing logs 125. Further, the bucket selector 212 may be configured to set the age ranges for different person buckets to match the age ranges for typical target audiences. Similarly, the bucket selector 212 may be configured to set an income range for each of the household buckets 215 based on income ranges for typical target audiences.

In general, the bucket selector 212 defines each of the person buckets based on age and gender. For example, the bucket selector 212 could define six person buckets: "male aged 18-49," "female aged 18-49," "male aged 50 or older," "female aged 50 or older," "male aged 17 or younger," and "female aged 17 or younger." In a complementary fashion, the bucket selector 212 defines each of the household buckets 215 based on a household size and, for each person within the household, a person bucket. For example, the bucket selector 212 could define the following household buckets 215: "one male aged 18-49," "one female aged 18-49," "a male aged 50 or older and a female aged 17 or younger," "two females aged 18-49 and a female aged 50 or older," etc.

In various embodiments, the bucket selector 212 may define the number and type of person buckets and/or the household buckets 215 based on any number of additional characteristics included in the marketing data 135 or any other data source. For example, the bucket selector 212 could further define the person buckets based on ethnicity and further define the household buckets 215 based on geographical location and household income. Further, in various embodiments the bucket selector 212 may define the household buckets 215 to collectively include only a portion of the households represented in the household viewing logs 125. For example, the bucket selector 212 could define a minimum household income for all of the household buckets 215. In another example, the bucket selector 212 could define the household buckets 215 to include only the households represented in the household viewing logs 125 that were characterized by a pattern of viewing programming associated with a particular genre.

The bucket selector 212 then configures the bucketing engine 214 to perform bucketing operations on the household viewing logs 125 based on the definitions for the person buckets and the household buckets 215. In some embodiments, the bucket selector 212 may also configure the weighting engine 180 of FIG. 1 to weight the viewing behavior 175 based on the definitions for the person buckets and/or the household buckets 215 in conjunction with the census data 190 to generate the viewership estimates 195.

The bucketing engine 214 combines the household viewing logs 125 with the marketing data 135 based on the PII 127 to characterize the persons within the households represented by the household viewing logs 125. For each person within each household, the household bucketing engine 214 then determines the associated person bucket. Subsequently, the household bucketing engine 214 distributes the household viewing logs 125 among the different household buckets 215 based on at least the size of the associated household and the person buckets associated with the persons within the household.

As shown, the modeling subsystem 160 includes, without limitation, a single-person household (HH) analyzer 222, a multi-person household (HH) analyzer 224, a viewing propensity engine 240, a viewing behavior estimator 260, a viewing behavior model 250, and an error analyzer 280. Upon receiving the household buckets 215, the modeling subsystem 160 determines which of the household buckets 215 are associated with single-person households and which of the household buckets 215 are associated with multi-person households. The modeling subsystem 160 routes the household buckets 215 that are associated with single-person households to the single-person household analyzer 222. By contrast, the modeling subsystem 160 routes the household buckets 215 that are associated with multi-person households to the multi-person household analyzer 224.

For each of the household buckets 215 that is associated with single-person households, the single-person household analyzer 222 computes propensities 232 for the single person bucket that is associated with the household bucket 215. In general, each of the propensities 232 is associated with a person bucket, one of the household buckets 215, and a program. A propensity 232 for a given person bucket, a given household bucket 215, and a given program indicates the likelihood of a person that is associated with the person bucket and included in a household that is associated with the household bucket 215 to view the program. For each household viewing log 125, since there is only one person within each single-family household, the single-person household analyzer 222 attributes the viewing behavior represented by the household viewing log 125 to the single person to compute the propensities 232.

For example, suppose that the household buckets 215 included the household bucket 215(1) that was associated with single-person households that included a female aged 18-25. Further, suppose that the associated household viewing logs 125 indicated that 7.5% of the households associated with the household bucket 215(1) viewed a given program. The single-person household analyzer 222 could set the propensity 232 for females aged 18-25 in single-family households to view the program equal to 7.5%. In a similar fashion, suppose that the household buckets 215 included the household bucket 215(2) that was associated with single-person households that included a male aged 18-25. Further, suppose that the associated household viewing logs 125 indicated that 30% of the households associated with the household bucket 215(2) viewed the program. The single-person household analyzer 222 could set the propensity 232 for males aged 18-25 in single-person households to view the program equal to 30%

For each of the household buckets 215 that is associated with multi-person households, the multi-person household analyzer 224 computes co-viewing impacts 234 based on the associated household viewing logs 125. A given co-viewing impact 234 indicates the likelihood that at least one of the persons within a multi-person household viewed a particular program. For each of the household buckets 215, the multi-person household analyzer 224 computes the averages of the viewing behavior represented by the associated household viewing logs 125 to generate the co-viewing impacts 224.

For example, suppose that the household buckets 215 included the household bucket 215(3) that was associated with two-person households that included a female aged 18-25 and a male aged 18-25. Further, suppose that the associated household viewing logs 125 indicated that 20% of the households associated with the household bucket 215(3) viewed a given program. For the program, the multi-person household analyzer 224 could set the co-viewing impact 234 for two-person households that included a female aged 18-25 and a male aged 18-25 equal to 20%. In a similar fashion, suppose that the household buckets 215 included the household bucket 215(4) that was associated with two-person households that included two males aged 18-25. Further, suppose that the associated household viewing logs 125 indicated that 50% of the households associated with the household bucket 215(3) viewed the program. For the program, the multi-person household analyzer 224 could set the co-viewing impact 234 for two-person households that include two males aged 18-25 equal to 50%.

The viewing propensity engine 240 receives the propensities 232 and the co-viewing impacts 234 and generates the viewing behavior model 250. The viewing propensity engine 240 implements a machine learning algorithm that attributes viewing behavior and computes the propensities 232 that are associated with the multi-person household buckets 215 in an order of increasing household size. Notably, the viewing propensity engine 240 leverages the propensities 232 for the single-person households as the initial values for the machine learning algorithm.

First, for each of the household buckets 212 that are associated with two-person households, the viewing propensity engine 240 attributes portions of the viewing behaviors specified by the household viewing logs 125 to the two persons within the household. More specifically, the viewing propensity engine 240 attributes a first percentage of the viewing behavior specified in the associated household viewing logs 125 to one of the persons within the household and a second percentage of the viewing behavior to the other person. Note that each percentage can vary from 0%-100%. For example, the viewing propensity engine 240 could determine that both persons within all households associated with the household bucket 215 viewed a given program and, consequently, set both the percentages equal to 100%.

The viewing propensity engine 240 attributes the viewing behavior based on the co-viewing impacts 234 associated with the two-person household bucket 212 and the propensities 232 for the corresponding single-person household bucket(s) 215. As referred to herein, for a two-person household bucket 212, the "corresponding" single-person household bucket(s) 215 is/are the household bucket(s) 215 to which the two persons within the household would be assigned if each of the persons were to be the only person within a household. Subsequently, the viewing propensity engine 240 computes the propensities 232 for each of the persons within the household based on the attributed viewing behavior.

For example, suppose that the propensity 232 for a female aged 18-25 in a single-person home to view a given program is 7.5%, and the propensity 232 for a male aged 18-25 in a single-person home to view the program is 30%. Further, suppose that the co-viewing impact 234 for the household bucket 215(3) that is associated with two-person households that include a female aged 18-25 and a male aged 18-25 is 20%. The viewing propensity engine 240 could estimate that 20% of the females aged 18-25 and 100% of the males aged 18-25 in the two-person households associated with the household bucket 215(3) viewed the show. Accordingly, for the show, the viewing propensity engine 240 could compute the propensity 232 for females aged 18-25 in the associated two-person households as 4% and the propensity 232 for males aged 18-25 in the associated two-person households as 20%.

In general, to compute the propensities 232 for multi-person households, the viewing propensity engine 240 attributes portions of the viewing behaviors represented by the household viewing logs 125 to the different persons within the household. For a given multi-person household bucket 215, the viewing propensity engine 240 computes the attributions based on the co-viewing impacts 242 associated with the multi-person household bucket 215 and the propensities 222 associated with smaller households. The viewing propensity engine 240 then computes the propensities 232 for the multi-person household bucket 215 based on the attributions. The viewing propensity engine 240 processes the household buckets 215 in an order of increasing household size until the viewing propensity engine 240 finishes processing all the household buckets 215.

As part of computing the propensities 232, the viewing propensity engine 240 generates the viewing behavior model 250. The viewing propensity engine 240 may generate the viewing behavior model 250 in any technically feasible fashion. Further, the viewing behavior model 250 may comprise any type of model in any format. For example, the viewing behavior model 250 could include an equation, a set of data, a set of logical rules, etc.

As shown, the viewing behavior estimator 260 computes the viewing behavior 175 based on the viewing behavior model 250. The viewing behavior estimator 260 may be configured to compute the viewing behavior 175 for any number and combinations of person buckets, the household buckets 215, and programs. Further, the viewing behavior estimator 260 may express the viewing behavior 175 in any technically feasible fashion. For example, the viewing behavior estimator 260 could express the viewing behavior 175 as a percentage, an absolute number, and so forth. For example, the viewing behavior estimator 260 could be configured to estimate the percentage of males aged 18-25 that live in New York that viewed Super Bowl 50. In another example, the viewing behavior estimator 260 could be configured to estimate the percentage of females aged 26 or older that viewed each program that was broadcast from 8 PM to 9 PM on a specific date.

To increase the accuracy of the viewing behavior model 250, the viewing behavior estimator 260 transmits the viewing behavior 175 to an error analyzer 280. The error analyzer 280 performs one or more comparison operations between the viewing behavior 175 and the group truth data 165 to determine multi-person household (HH) errors 285. The viewing propensity engine 260 then performs any number and type of optimization operations on the viewing behavior model 250 to generate an updated viewing behavior model 250 that reduces the multi-person household errors 285. Accordingly, as the modeling subsystem 220 operates, the accuracy of the computed viewing behaviors 175 increase.

Note that the techniques described herein are illustrative rather than restrictive, and may be altered without departing from the broader spirit and scope of the invention. Many modifications and variations on the functionality provided by the bucketing subsystem 210 and the modeling subsystem 220 will be apparent to those of ordinary skill in the art without departing from the scope and spirit of the described embodiments. For instance, in various embodiments, any number of the techniques may be implemented while other techniques may be omitted in any technically feasible fashion that computes viewing behaviors based on viewing data at the household-level and marketing data at the person-level.

Figure 3A:
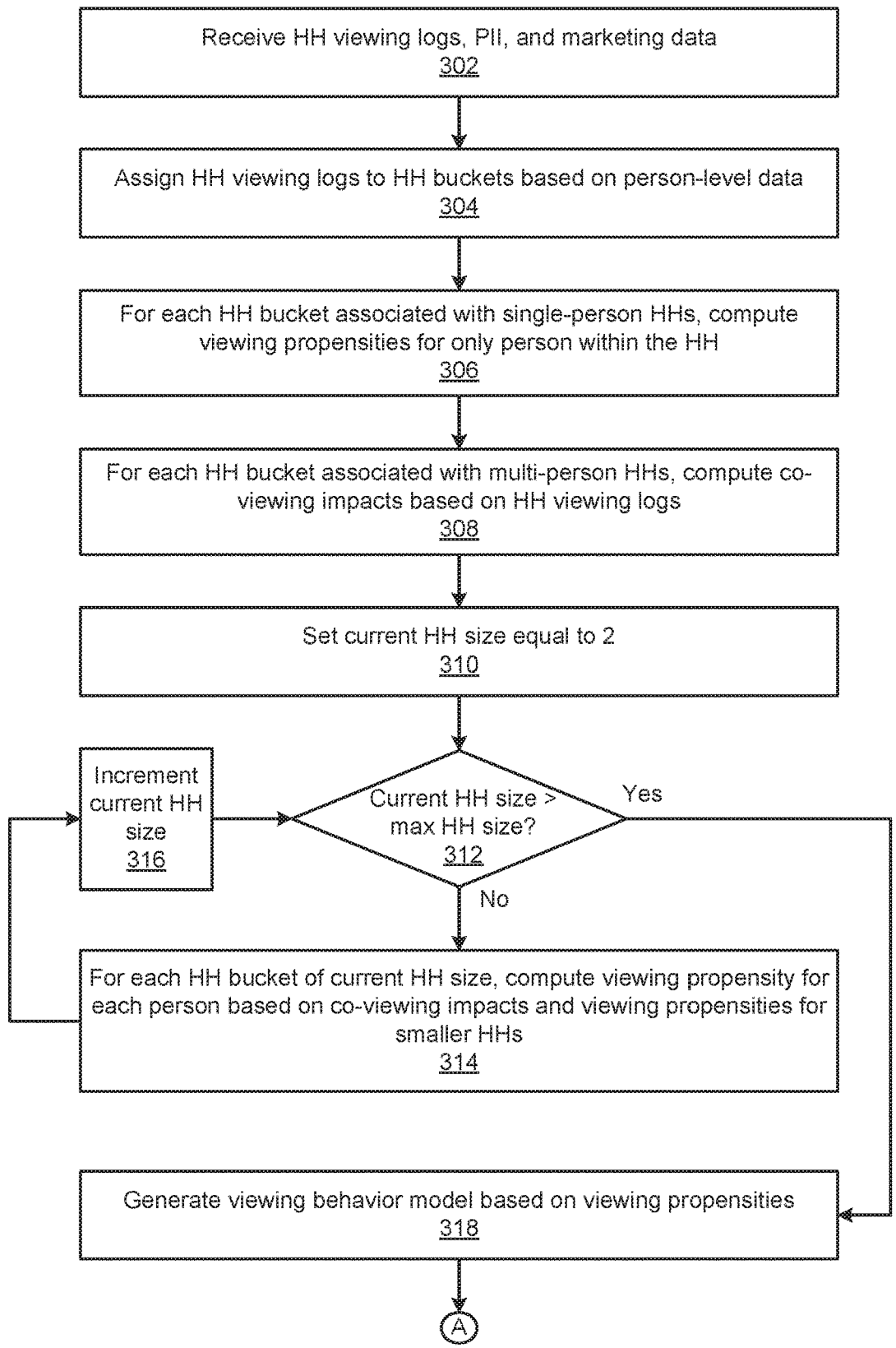
FIGS. 3A and 3B set forth a flow diagram of method steps for estimating viewership among target audiences, according to various embodiments of the present invention.
Figure 3B:
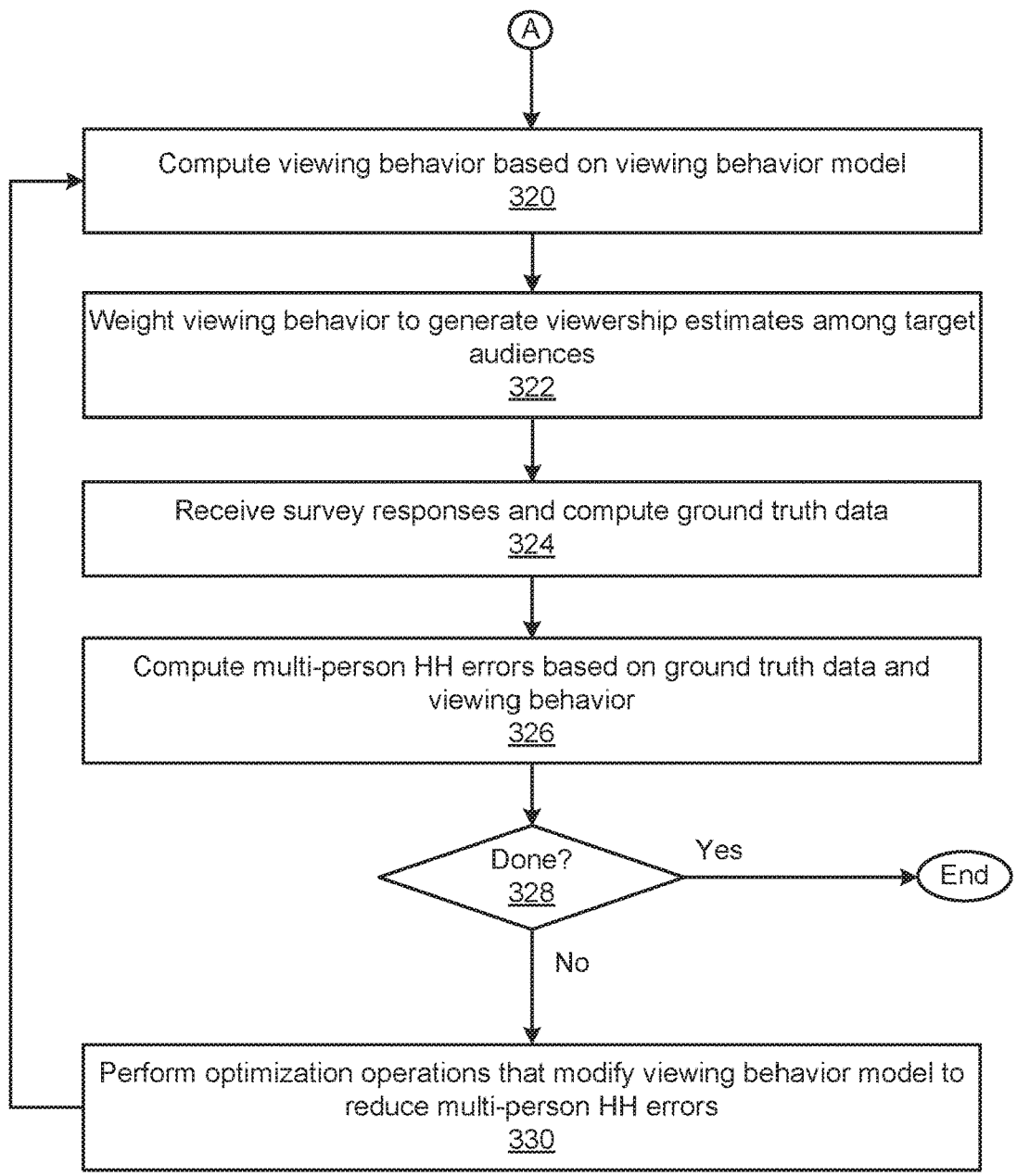

FIGS. 3A and 3B set forth a flow diagram of method steps for estimating viewership among target audiences, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the bucket selector 212 receives the household viewing logs 125, the personally identifiable information (PII) 127, and the marketing data 135. As part of step 302, the bucket selector 212 defines person buckets and the household buckets 215. At step 304, the bucketing engine 214 assigns the household viewing logs 125 to the household buckets 215 based on the PII 127 and the marketing data 135. As part of assigning the household viewing logs 125 to the household buckets 215, the bucketing engine 214 also assigns the persons within the associated households to person buckets.

At step 306, for each of the single-person household buckets 215, the single-person household analyzer 222 computes the averages of the viewing behavior that is represented by the household viewing logs 125. For each of the single-person household buckets 215, the single-person household analyzer 222 then sets the propensities 232 for the single associated person bucket equal to the averages. At step 308, for each of the multi-person household buckets 215, the multi-person household analyzer 224 sets the associated co-viewing impacts 234 equal to the averages of the viewing behavior that is represented by the associated household viewing logs 125.

At step 310, the viewing propensity engine 240 sets a current household size equal to two. At step 312, the viewing propensity engine 240 determines whether the current household size is greater than a maximum household size. If, at step 312, the viewing propensity engine 240 determines that the current household size is not greater than the maximum household size, then the method 300 proceeds to step 314. At step 314, for each of the household buckets 215 that is associated with the current household size, the viewing propensity engine 240 computes the propensities 232 for each of the associated person buckets. More specifically, for the person buckets associated with a given household bucket 215, the viewing propensity engine 240 computes the propensities 232 based on the co-viewing impacts 234 associated with the household bucket 215 and the propensities 232 for households of smaller household sizes.

At step 316, the viewing propensity engine 240 increments the current household size, and the method 300 returns to step 312, where the viewing propensity engine 240 determines whether the current household size exceeds the maximum household size. If, however, at step 312, the viewing propensity engine 240 determines that the current household size exceeds the maximum household size, then the method proceeds directly to step 318. At step 318, the viewing propensity engine 240 generates the viewing behavior model 250 based on the viewing propensities 232.

At step 320, the viewing behavior estimator 260 computes the viewing behavior 175 based on the viewing behavior model 250. At step 322, the weighting engine 180 performs for target audiences. Advantageously, because the viewing behavior estimator 260 generates the viewing behavior 175 at the granularity of the person buckets, the weighting engine 180 may generate accurate viewership estimates 195 for target audiences that are distinguished by person-level characteristics.

At step 324, the survey analyzer 160 receives the survey responses 155 and generates the ground truth data 165 based on the survey responses 155. At step 326, the error analyzer 280 performs one or more comparison operations between the viewing behavior 175 and the ground truth data 165 to generate the multi-person household errors 285.

At step 328, the viewing behavior subsystem 240 determines whether the viewing behavior subsystem 240 has finished operating. If, at step 328, the viewing behavior subsystem 240 determines that the viewing behavior subsystem 240 has finished operating, then the method 300 terminates. If, however, at step 328, the viewing behavior subsystem 240 determines that the viewing behavior subsystem 240 has not finished operating, then the method 300 proceeds to step 330.

At step 330, the viewing propensity engine 240 performs one or more optimization operations to generate an updated viewing behavior model 250 that is configured to reduce the multi-person household errors 285. The method 300 then returns to step 320, where the viewing behavior estimator 260 computes new viewing behavior 175 based on the updated viewing behavior model 250. The viewing behavior subsystem 140, the survey analyzer 160, and the weighting engine 180 continues to cycle through steps 320-330, until the viewing behavior subsystem 240 determines that the viewing behavior subsystem 240 has finished operating (at step 328). In this fashion, the viewing behavior subsystem 240 continually increases the accuracy of the viewing behavior model 250 and the viewership estimates 195.

In sum, the disclosed techniques may be implemented to estimate viewership among target audiences. First, a bucketing subsystem merges household viewing logs with per-person data and buckets the household viewing logs based on household size and per-person characteristics. For each household bucket in a sequential order of increasing household size, a viewing propensity engine selectively attributes the viewing behavior represented by the associated household viewing logs to the various persons within the household to generate propensities. For single-person households, the viewing propensity engine attributes the viewing behavior represented by the associated household viewing logs to the single person within the household. For multi-person households, the viewing propensity engine attributes the viewing behavior represented by the associated household viewing logs to one or more of the persons within the household based on the propensities for smaller sized households.

The viewing propensity engine generates a viewing behavior model based on the propensities. Subsequently, a viewing behavior estimator estimates viewing behaviors for target audiences based on the viewing behavior model. Finally, a weighting engine computes viewership among the target audiences based on the viewing behaviors and census data. Notably, the viewing propensity engine continuously refines the viewing behavior model to minimize errors associated with multi-person households based on ground truth data obtained via surveys.

Advantageously, by strategically defining buckets, the viewing behavior estimator may be configured to reliably estimate per-person viewership across a wide range of target audiences. In particular, because the household data represents a relative large percentage of television-enabled households, the viewing behavior estimator may accurately estimate viewership among relatively small target audiences. Further, because the viewing behavior estimator estimates per-person viewing behavior, the viewing behavior estimator may reliably estimate viewership among target audiences that are distinguished by person-level characteristics, such as age and gender.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for estimating viewership among target audiences, the method comprising:

assigning a first household viewing log to a first bucket of one or more household viewing logs based on person-level data, wherein the first bucket is associated with a single-person household and a first set of one or more person-level characteristics;

assigning a second household viewing log to a second bucket of one or more household viewing logs based on the person-level data, wherein the second bucket is associated with a multi-person household and the first set of one or more person-level characteristics;

performing one or more machine learning operations to generate a model based on first viewing propensities associated with the first bucket and second viewing propensities associated with the second bucket, wherein the one or more machine learning operations comprise computing the second viewing propensities based on the first viewing propensities and co-viewing impacts associated with the second bucket; and computing a first viewership among a first target audience that is associated with the first set of one or more person-level characteristics based on the model and census data.

2. The computer-implemented method of claim 1, wherein the person-level data comprises at least one of demographic data or psychographic data.

3. The computer-implemented method of claim 1, wherein the first set of one or more person-level characteristics includes at least one of an age range or a gender.

4. The computer-implemented method of claim 1, wherein generating the model comprises:

assigning one or more first viewing behaviors represented by the first household viewing log to the first set of one or more person-level characteristics to generate the first viewing propensities;

assigning at least a first portion of one or more second viewing behaviors represented by the second household viewing log to the first set of one or more person-level characteristics to generate the second viewing propensities based on the first viewing propensities; and computing one or more third viewing behaviors that are associated with the first set of one or more person-level characteristics based on at least the first viewing propensities and the second viewing propensities.

5. The computer-implemented method of claim 4, wherein generating the model further comprises:

assigning at least a second portion of the one or more second viewing behaviors to a second set of one or more person-level characteristics to generate fourth viewing propensities based on the first viewing propensities and third viewing propensities; and computing one or more fourth viewing behaviors that are associated with the second set of one or more person-level characteristics based on at least the third viewing propensities and the fourth viewing propensities.

6. The computer-implemented method of claim 5, further comprising computing a second viewership among a second target audience that is associated with the second set of one or more person-level characteristics based on the model and the census data.

7. The computer-implemented method of claim 1, wherein performing the one or more machine learning operations further comprises:
computing an error associated with the model based on survey data; and
performing the one or more machine learning operations on the model to generate an updated model that is configured to minimize the error.

8. The computer-implemented method of claim 7, wherein the survey data includes a response from a household that includes at least one person who is a member of the first target audience.

9. The computer-implemented method of claim 7, further comprising, prior to computing the error, performing one or more operations on original survey data to generate the survey data, wherein the one or more operations compensate for at least one of an out-of-home viewership or a viewership overstatement.

10. The computer-implemented method of claim 1, wherein assigning the first household viewing log to the first bucket comprises performing one or more comparison operations between the person-level data and personally identifiable information (PII) that is associated with the first household viewing log.

11. A computer-readable storage medium including instructions that, when executed by a processing unit, cause the processing unit to estimate viewership among target audiences by performing the steps of:
assigning a first household viewing log to a first bucket of one or more household viewing logs based on person-level data, wherein the first bucket is associated with a single-person household and a first set of one or more person-level characteristics;
assigning a second household viewing log to a second bucket of one or more household viewing logs based on the person-level data, wherein the second bucket is associated with a multi-person household and the first set of one or more person-level characteristics;
performing one or more machine learning operations to generate a model based on first viewing propensities associated with the first bucket and second viewing propensities associated with the second bucket, wherein the one or more machine learning operations comprise computing the second viewing propensities based on the first viewing propensities and co-viewing impacts associated with the second bucket; and
computing a first viewership among a first target audience that is associated with the first set of one or more person-level characteristics based on the model and census data.

12. The computer-readable storage medium of claim 11, wherein the person-level data comprises at least one of demographic data or psychographic data.

13. The computer-readable storage medium of claim 12, wherein the psychographic data is associated with at least one of spending habits, interests, or activities.

14. The computer-readable storage medium of claim 11, wherein the first set of one or more person-level characteristics includes at least one of an age range or a gender.

15. The computer-readable storage medium of claim 11, wherein generating the model comprises:
assigning one or more first viewing behaviors represented by the first household viewing log to the first set of one or more person-level characteristics to generate the first viewing propensities;
assigning at least a first portion of one or more second viewing behaviors represented by the second household viewing log to the first set of one or more person-level characteristics to generate the second viewing propensities based on the first viewing propensities; and
computing one or more third viewing behaviors that are associated with the first set of one or more person-level characteristics based on at least the first viewing propensities and the second viewing propensities.

16. The computer-readable storage medium of claim 15, wherein generating the model further comprises:
assigning at least a second portion of the one or more second viewing behaviors to a second set of one or more person-level characteristics to generate fourth viewing propensities based on the first viewing propensities and third viewing propensities; and
computing one or more fourth viewing behaviors that are associated with the second set of one or more person-level characteristics based on at least the third viewing propensities and the fourth viewing propensities.

17. The computer-readable storage medium of claim 11, wherein performing the one or more machine learning operations further comprises:
computing an error associated with the model based on survey data; and
performing the one or more machine learning operations on the model to generate an updated model that is configured to minimize the error.

18. The computer-readable storage medium of claim 17, wherein the survey data includes self-reported viewing behavior for each person within at least one other multi-person household.

19. The computer-readable storage medium of claim 17, the steps further comprising, performing one or more optimization operations on at least one of an out-of-home viewership algorithm or a viewership overstatement algorithm based on the survey data.

20. A system comprising:
a memory storing a viewing behavior engine; and
a processor that is coupled to the memory and, when executing the viewing behavior engine, is configured to:
assign a first household viewing log to a first bucket of one or more household viewing logs based on person-level data, wherein the first bucket is associated with a single-person household and a first set of one or more person-level characteristics,
assign a second household viewing log to a second bucket of one or more household viewing logs based on the person-level data, wherein the second bucket is associated with a multi-person household and the first set of one or more person-level characteristics,
perform one or more machine learning operations to generate a model based on first viewing propensities associated with the first bucket and second viewing propensities associated with the second bucket, wherein the one or more machine learning operations comprise computing the second viewing propensities based on the first viewing propensities and co-viewing impacts associated with the second bucket, and
compute a first viewership among a first target audience that is associated with the first set of one or more person-level characteristics based on the model and census data.

* * * * *